US008850908B2

(12) United States Patent
Liu et al.

(10) Patent No.: US 8,850,908 B2
(45) Date of Patent: Oct. 7, 2014

(54) ELASTOMERIC PARALLEL STAGE WITH FLEXURAL HINGES TO PROVIDE MULTI-DEGREE-OF-FREEDOM SENSITIVITY OF AN AERODYNAMICALLY FLOATED PROBE HEAD TO DISTURBANCE IN 3D SPACE

(71) Applicant: Xerox Corporation, Norwalk, CT (US)

(72) Inventors: Yu Liu, Mississauga (CA); Johann E. Junginger, Toronto (CA); Gaetano Lavigne, Burlington (CA); Vlad Skorokhod, Mississauga (CA); Sarah J. Vella, Milton (CA)

(73) Assignee: Xerox Corporation, Norwalk, CT (US)

( * ) Notice: Subject to any disclaimer, the term of this patent is extended or adjusted under 35 U.S.C. 154(b) by 156 days.

(21) Appl. No.: 13/648,032

(22) Filed: Oct. 9, 2012

(65) Prior Publication Data

US 2014/0096629 A1 Apr. 10, 2014

(51) Int. Cl.

*G01M 99/00* (2011.01)
*G01N 27/24* (2006.01)
*G01N 27/61* (2006.01)

(52) U.S. Cl.

USPC .......... 73/866.5

(58) Field of Classification Search

CPC ......... G01D 2/00; G01M 19/00; G01N 21/17; G01N 27/24; G01N 27/61
USPC ................ 73/866.5, 37.5, 105; 324/690, 456, 324/750.19, 750.16, 755.08–755.09
See application file for complete search history.

(56) References Cited

U.S. PATENT DOCUMENTS

| | | | | |
|---|---|---|---|---|
| 5,678,303 | A * | 10/1997 | Wichmann | 29/806 |
| 6,119,536 | A * | 9/2000 | Popovic et al. | 73/866.5 |
| 6,504,643 | B1 * | 1/2003 | Peeters et al. | 359/290 |
| 7,527,998 | B2 | 5/2009 | Tung et al. | |
| 7,896,610 | B2 | 3/2011 | Kao | |
| 7,990,628 | B1 | 8/2011 | Calvet et al. | |
| 8,169,210 | B2 | 5/2012 | Junginger et al. | |
| 2011/0170157 | A1 | 7/2011 | Ueda et al. | |

OTHER PUBLICATIONS

Yong et al, "Review of Circular Flexure Hinge Design Equations and Derivation of Empirical Formulations", Precision Engineering 32 (2008) pp. 63-70, Elsevier.com.

* cited by examiner

*Primary Examiner* — Peter Macchiarolo
*Assistant Examiner* — Anthony W Megna Fuentes
(74) *Attorney, Agent, or Firm* — MH2 Technology Law Group LLP

(57) ABSTRACT

A method and structure for a device including a non-contact gap control device for maintaining a distance between surfaces can include a pliable platform, a frame to which the pliable platform is secured, an aerodynamic floating (AF) head attached to the pliable platform and a probe for measuring, testing, and/or characterizing a substrate adjacent to the AF head. A pressurized gas source can be coupled to the AF head, such that a pressurized gas is ejected onto the substrate to maintain a distance between the substrate and the AF head during measurement. While the frame can be held immobile, the pliable platform can react in response to irregularities in the substrate to maintain a generally constant distance between the AF head and the substrate.

20 Claims, 9 Drawing Sheets

ELASTOMERIC PARALLEL STAGE WITH FLEXURAL HINGES TO PROVIDE MULTI-DEGREE-OF-FREEDOM SENSITIVITY OF AN AERODYNAMICALLY FLOATED PROBE HEAD TO DISTURBANCE IN 3D SPACE

FIELD OF THE EMBODIMENTS

This present teachings relate to a scanning system and, more particularly, to a constant distance contactless device and process for using the device.

BACKGROUND OF THE EMBODIMENTS

Precision positioning and gap control between two or more surfaces is of importance in many fields such as semiconductor manufacturing, micrometrology and nanometrology, flexible display manufacturing, inkjet printing, etc, Prior methods and structures for precision positioning and gap control are referred to as aerodynamic floating, which are described in U.S. Pat. Nos. 6,119,536 and 8,169,210, the disclosures of which are incorporated herein by reference in their entirety. The aerodynamic floating technique can employ the use of a precise gap control apparatus and method for use with surfaces and/or substrates moving relative to a head of the aerodynamically floatable device. The aerodynamic floating head can move in a linear direction (up and down) relative to the surface positioned adjacent to the head to maintain a space between the head and the surface. Pressurized air output by the aerodynamic floating device maintains the space between a measurement electrode and the surface. The surface can rotate or otherwise move relative to the measurement electrode which the space is maintained by the pressurized air.

While aerodynamic floating devices of the above-described design can provide a suitable gap control and measurement solution for many uses, the sensitivity of the apparatus can be negatively affected by an imperfect mechanical surface over which the aerodynamic floating apparatus floats, as well as tilt alignment of the aerodynamic floating device head. An aerodynamically floating device design which has enhanced transient response to disturbances on a moving surface or substrate, better sensitivity to axial and angular motions, and improved response along multiple directions which are highly asymmetric in 3D space than previous aerodynamically floating devices would be desirable.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment of the present teachings, an apparatus including a non-contact gap control device for maintaining a distance between surfaces can include a pliable platform including a flexible sheet, a frame having an opening therethrough, wherein the pliable platform is secured to the frame and within the opening in the frame, a floating head attached to the pliable platform, and a pressurized gas source attached to the floating head.

In another embodiment of the present teachings, a method for measuring a substrate can include positioning a floating head device adjacent to a substrate, wherein, the floating head device comprises a pliable platform including a flexible sheet, a frame having an opening therethrough, wherein the pliable platform is secured to the frame and within the opening in the frame, a floating head attached to the pliable platform, and a pressurized gas source attached to the floating head. The method can further include ejecting a pressurized gas through a channel within the floating head and onto the substrate, and measuring the substrate using the floating head during the ejection of the pressurized gas wherein, during the measurement of the substrate, the pliable platform flexes to self-adjust a distance between the floating head and the adjacent substrate.

In another embodiment of the present teachings, an apparatus including a non-contact gap control device for maintaining a distance between surfaces can include a pliable platform including a flexible sheet having a center portion and flexural hinges, wherein each flexural hinge is proximate to a vertex of the center portion of the pliable platform.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts.

An embodiment of the present teachings can provide an aerodynamic floating (AF) device which includes an elastically deformable parallel support member to hold an AF device head. The elastically deformable parallel support member can include three flexure hinges which can be sensitive to at least six degrees of motion of the AF head in 3D space. Flexural hinge design equations are discussed in the article "*Review of circular flexure hinge design equations and derivation of empirical formulations*," Yong, Y. K., et al., Precision Engineering, 2008, 32, pp. 63-70, which is incorporated herein by reference in its entirety. The parallel design may allow the AF head to move with little or no blacklash, wear, and/or friction, and can have good dynamic properties for applications where the surface adjacent to the AF head has a high speed of movement or rotation. Coupling of different degrees of freedom motion can be reduced to provide improved linear relation between head motions and disturbance from diverse directions. The flexure hinge design can promote smooth and continuous motion of the head, and has a high sensitivity to all degree of freedom disturbances. The AF device design of the present teachings permits sustained unattended operation, including mechanical robustness and vibration dampening. The device can be manufactured at a reasonable cost and may be customized for specific design requirements, An AF device platform (parallel stage) can be manufactured from curable elastomeric materials such as polydimethylsiloxane (PDMS), polysiloxane, polyalkylsiloxane, polyurethane, polyester, polyfluorosilioxanes, polyolefin, fluoroelastomer, synthetic rubber, natural rubber, and mixtures thereof. A material such as PDMS has good chemical stability in harsh environments such as humid settings.

Figure 1A:
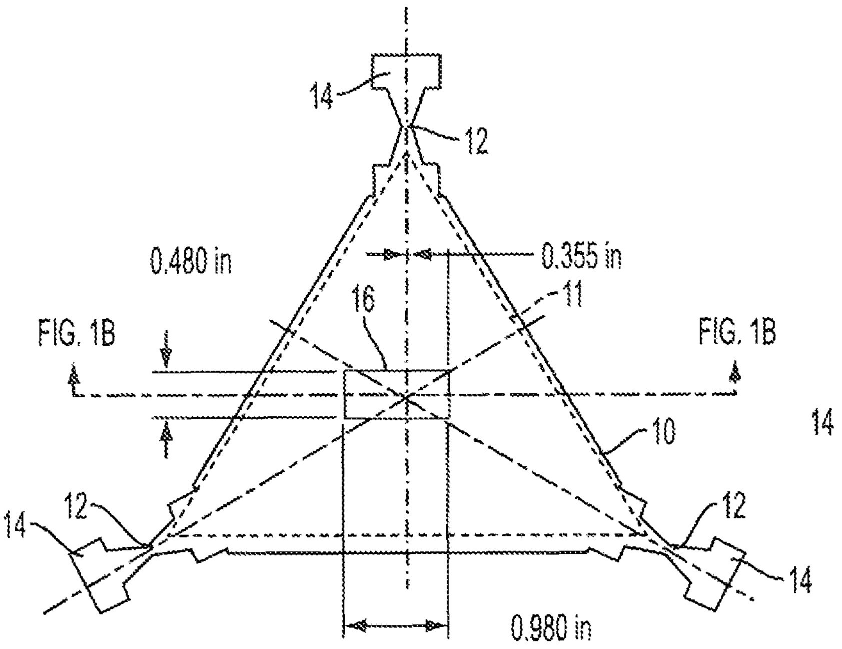
FIGS. 1A, 1C, 1D, and 1E are plan views.
Figure 1B:
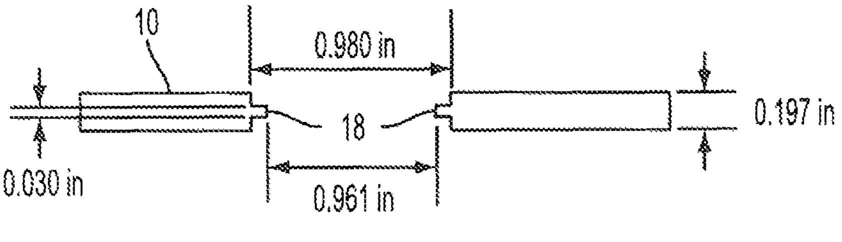
FIG. 1B is a cross section, of various pliable platforms (parallel stages) for an aerodynamic floating (AF) device or a non-contact gap control device in accordance with an embodiment of the present teachings.
Figure 1C:
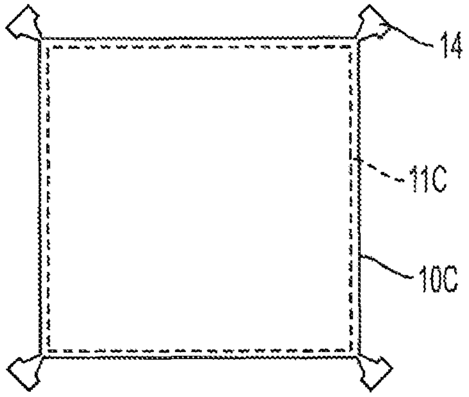
Figure 1D:
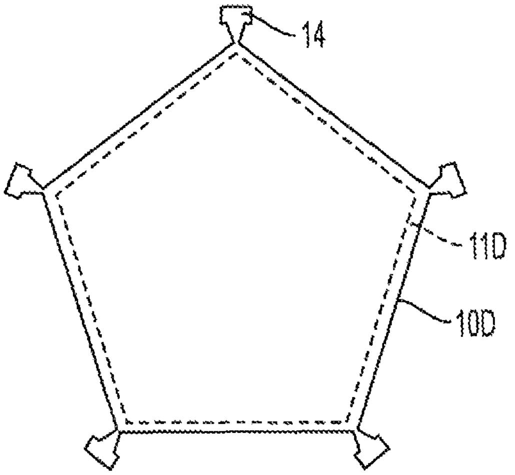
Figure 1E:
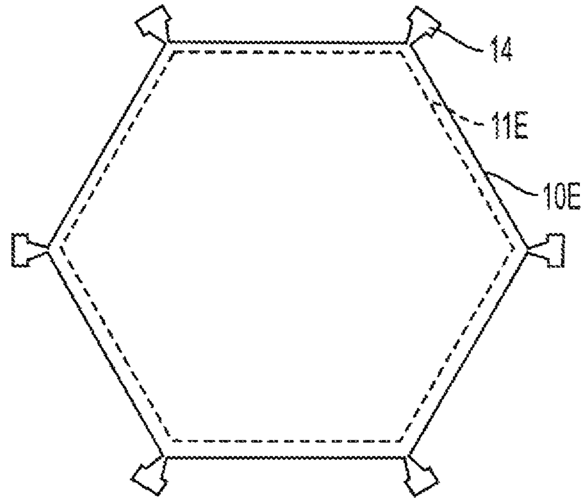

An embodiment of the present teachings can include the formation of an AF device platform 10 as depicted in FIG. 1A, which is a plan view, and FIG. 1B, which is a magnified cross section of FIG. 1A. It will be understood that the labeled dimensions are for illustration only, and may vary from the examples given.

Figure 4:
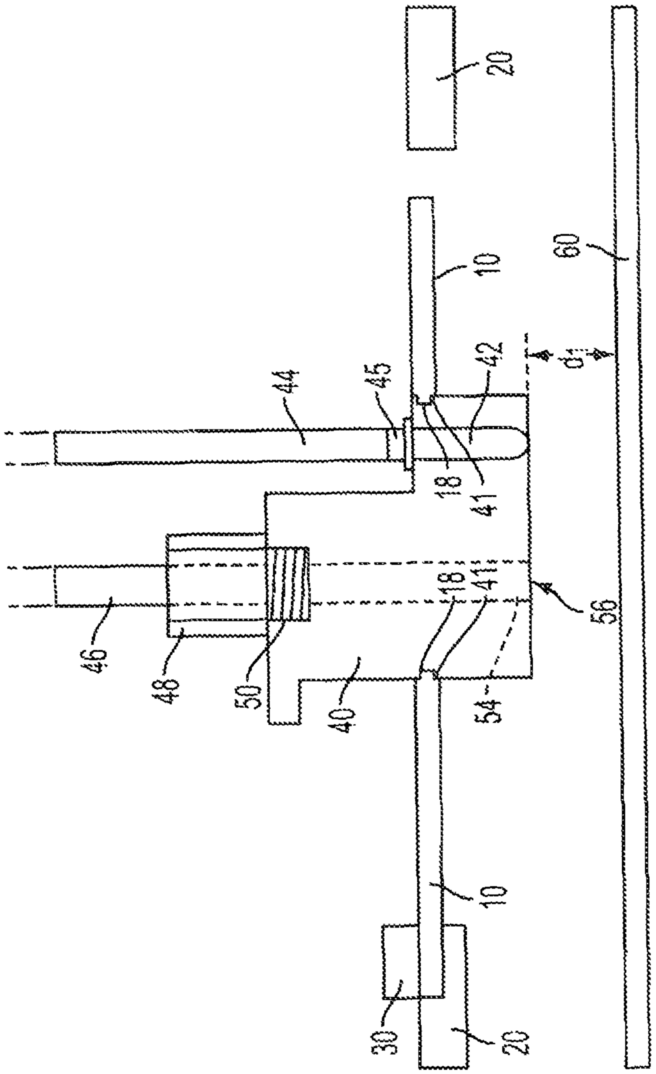
FIG. 4 is a cross section depicting an AF head in accordance with an embodiment of the present teachings.

The platform 10 can be manufactured from a flexible sheet, for example a pliable polymer such as a curable elastomer. In an embodiment, the pliable platform can include polysiloxane, polyalkylsiloxane, polyurethane, polyester, polyfluorosilioxanes, polyolefin, fluoroelastomer, synthetic rubber, natural rubber, and mixtures thereof. In an embodiment, a center portion of the platform 10 generally has the shape of an equilateral triangle 11. It will be understood that the equilateral triangle 11 is a descriptive element, and that the center portion of the platform 10 defined by three edges of the platform 10 generally has the appearance of 11 equilateral triangle 11. The platform 10 can include three flexural hinges 12, with each flexural hinge 12 being located in proximity to a vertex of the equilateral triangle 11 as depicted in FIG. 1. Each flexural hinge 12 is integral with a mounting tab 14. While the mounting tabs 14 are depicted as being rectangular, the tabs 14 can be formed in any suitable shape such as round, square, etc. The platform 10 can further include one or more openings 16 which are configured to receive an AF head 40 (FIG. 4) as described below. A ridge or lip 18 can be formed around the perimeter of the opening 16 which is configured to fit into a recess or slot 41 formed around the AF head 40 as depicted in FIG. 4. As depicted, the ridge or lip 18 has a thinner profile than other portions of the platform 10, and assists in keeping the AF head 40 affixed to the platform 10 after attachment of the AF head 40 to the platform 10.

It will be understood that the FIGS. herein represent generalized schematic illustrations and that other components may added or existing components may be removed or modified. For example, the pliable platform 10 can have a shape other than the triangular 11 shape depicted in FIG. 1A, for example square 1C, pentagonal 1D, hexagonal 1E, etc, Each pliable platform 10-10E can include an opening therethrough similar to the opening 16 in FIG. 1A through which an AF head 40 will extend as described below.

To form the platform, a mold can be manufactured using, for example, a 3D commercial printer to form a printed mold. The mold can include a platform-shaped cavity. A suitable liquid material, such as a PDMS elastomeric polymer solution or a solution of one of the other materials described above, is dispensed into the cavity and then cured using a curing technique suitable for the material used. After curing, a platform can have a thickness of between about 0.25 mm and about 25 mm, or between about 0.25 mm and about 15 mm, or between about 3.5 mm and about 6.5 mm, or between about 0.5 and about 20 mm, for example between about 4.8 mm and about 5.1 mm. Other platform thicknesses can be used, depending on the specific material.

Figure 2:
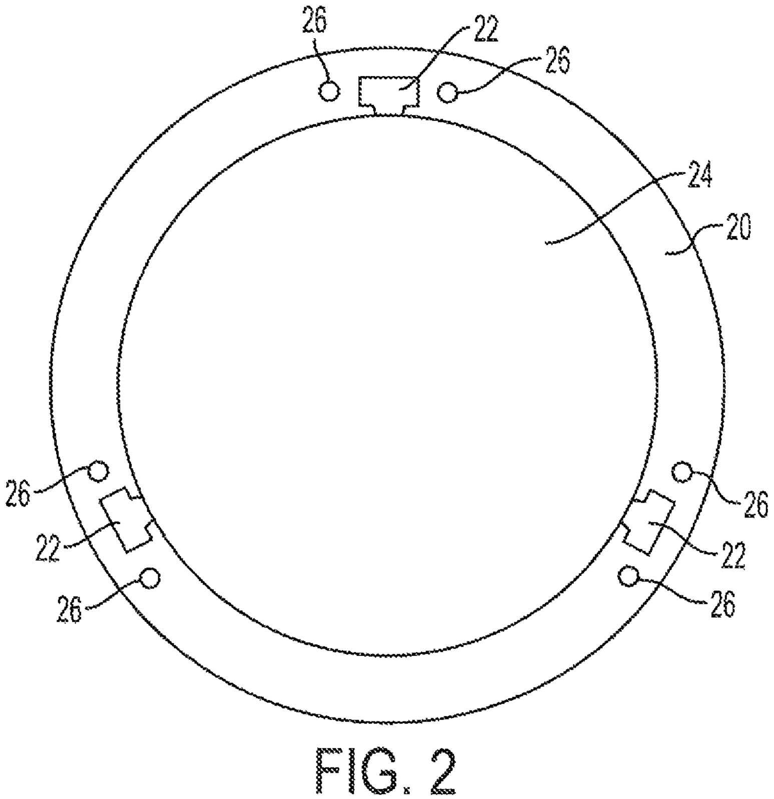
FIG. 2 is a plan view of a frame for an AF device in accordance with n embodiment of the present teachings.

FIG. 2 is a plan view depicting a circular frame 20 which is configured to receive and secure the platform 10. The circular frame 20 can be formed to include a plurality of mounting recesses 22, which are shaped to receive the plurality of tabs 14 of the platform 10. In an embodiment, the frame 20 can be manufactured from one or more metals, metal alloys, and/or plastics. The frame 20 can further include a plurality of threaded holes 26.

Figure 3:
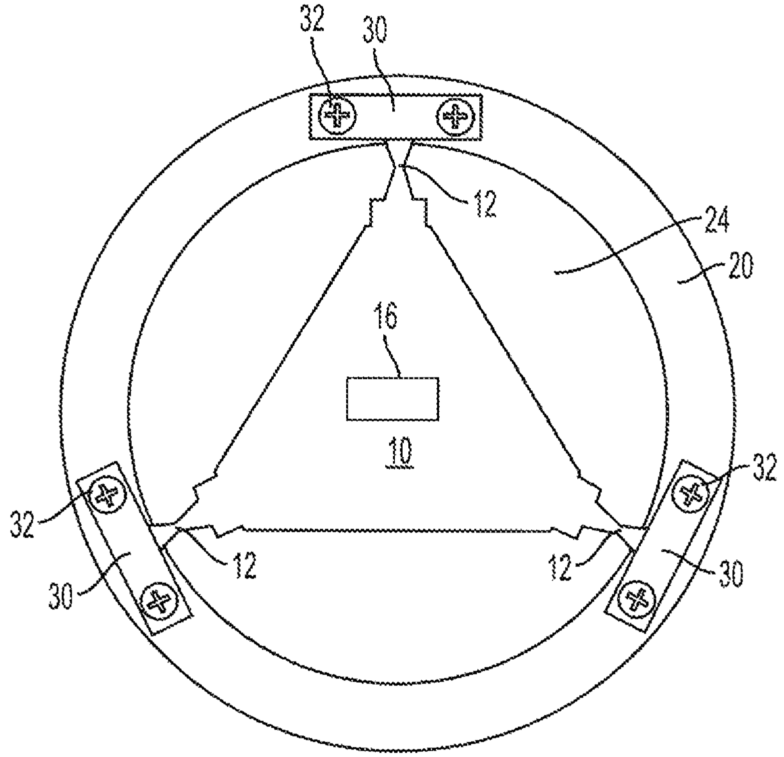
FIG. 3 is a plan view depicting the platform of FIG. 1 attached to the frame of FIG. 2.

Next, the three tabs 14 of the platform 10 are placed into the three recesses 22 of the frame 20 as depicted in the plan view of FIG. 3. A plate 30 can be placed over each tab 14 and secured using a plurality of mounting screws 32 to ensure that the tabs 14 remain connected to the frame 20 during use. Techniques for securing the pliable elastomeric platform 10 to the frame 20 and within the opening 24 in the frame 20 other than through the use of mounting tabs 14 and recesses 22 are also contemplated.

Subsequently, as depicted in the cross section of FIG. 4 and the perspective depiction of FIG. 5, an AF head 40 is placed within the opening 16 of the platform 10. The ridge 18 around the perimeter of opening 16 of the platform 10 can fit into a slot or recess 41 within the AF head 40 as depicted. The ridge 18 and friction between the AF head 40 and the polymer material of the platform 10 is sufficient to secure the AF head 40 to the platform 10.

The AF head 40 can include a measurement probe 42, such as an amplified capacitive probe, attached to a first end of a cable 44 such as a coaxial cable, A coupling 45 can physically attach the cable 44 to the floating head 40.

Figure 5:
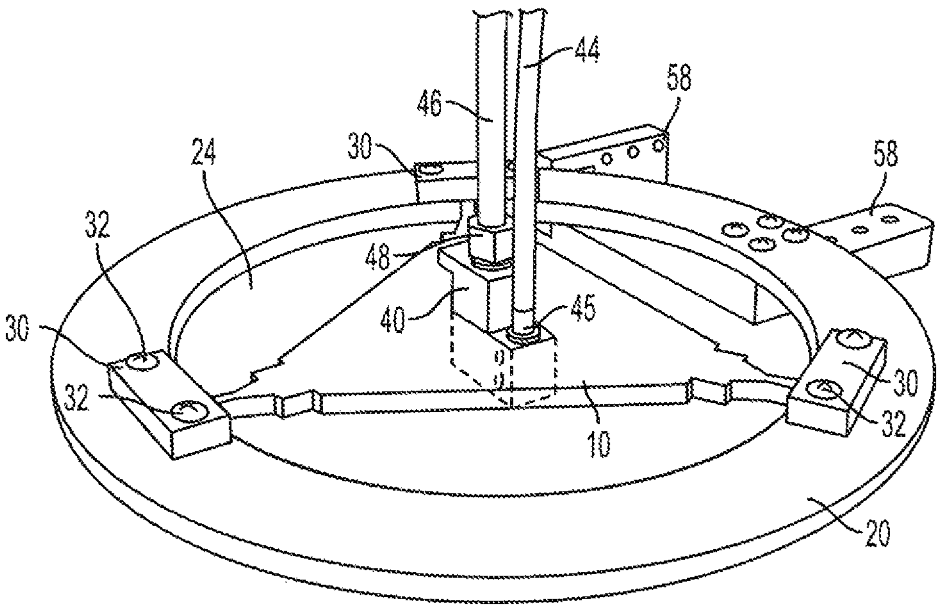
FIG. 5 is a perspective depiction of structures of FIG. 4.

FIGS. 4 and 5 also depict a flexible hose 46 attached at a first end to the floating head 40, for example with a threaded coupling 48 that can be screwed into threads 50 of the floating head 40. A second end of the flexible hose 46 can be attached to a pressurized gas source 52 (FIG. 6), such as an air compressor. A channel 54 within the floating head 40 delivers air from the flexible hose 46 to an orifice 56 at the end of channel 54 and onto a substrate 60. The pressurized gas is delivered to the channel from the flexible hose 46 at a first location at a first side of the platform 10, and delivered onto the substrate at a second location at a second side of the platform which is opposite the first side. The AF head 40 is held in position during delivery of the pressurized gas and measurement of the surface 60 by the platform 10, which is in turn secured to the frame 20. The frame 20 can be secured to a stable surface (not individually depicted for simplicity) using, for example, a frame mounting bracket 58.

During use, the AF head 40 can be positioned adjacent to a surface of the substrate 60, for example a rotating drum, a semiconductor wafer, or another substrate which is to be measured, tested, and/or characterized (hereinafter, collectively, "measured") by the probe 42 of the AF head 40.

During operation, the pressurized air source 52 can deliver pressurized gas to the AF head 40 through the flexible hose 46. The gas pressure can depend on various factors such as the weight of the AF head 40 and the size of the orifice 56 in the channel 54. In an embodiment, for an AF head weighing about 12 grams, gas can be delivered to the AF head 40 at a pressure of between about 10 psi and about 80 psi, or between about 25 psi and about 70 psi, or between about 40 psi and about 60 psi, The pressurized gas delivered to the AF head at a first location 50 is ejected from the orifice and delivered onto the substrate 60, which maintains a distance $d_1$ between the lower surface of the floating head 40 and the substrate 60. A gas pressure of between about 40 psi and about 60 psi can result in a 12 gram head which floats between about 10 μm and about 100 μm above the substrate 60. As depicted in FIG. 4, a first distance $d_1$ from the lower surface of the floating head 40 to the substrate 60 is either less than or equal to a second distance from the lower surface of the pliable platform 10 to the substrate 60 and a third distance from the lower surface of the frame 20 to the substrate 60 during measurement of the substrate.

The design of the flexural hinges 12 can promote smooth and continuous motions of the AF head 40 during measurement of the substrate 60. The platform 14 can self-adjust to irregularities in the adjacent substrate 60. While the frame 20 can remain immobile during the measurement and/or characterization of the substrate 60, the pliable platform 10, in conjunction with the pressurized air being emitted from the orifice 56, flexes the platform 10 to generally maintain a distance $d_1$ (FIG. 4) between the AF head 40 and the substrate 60 at a relatively constant spacing within a desired tolerance.

While some prior designs allow movement in only two directions (i.e., up and down relative to the substrate being measured) the flexible platform 10 can have a high sensitivity to all degree of freedom disturbances from multiple directions, including X-, Y-, and Z-directions, the rotational direction about the Z-axis perpendicular to the surface of the platform 10 (i.e., yaw), and about a horizontal axis parallel to the surface of the platform 10 (i.e., roll).

Additionally, the characteristics of the flexible platform 10 can be tailored for a specific use. If the platform 10 is to be used for a substrate 60 which is known to have generally even surface, the platform 10 can be manufactured to be more rigid so that a distance $d_1$ is maintained over the even surface. In contrast, if the platform 10 is to be used for a substrate 60 which is known to have a variable surface, the platform can be manufactured to be more pliable so that it more quickly adjusts to variations in the substrate 60 being measured. The characteristics of a platform 10 can be adjusted during design of the platform, or example depending on the material thickness, material composition, cross sectional area of the flexural hinges 12, etc. For example, a thicker platform will generally be more rigid, while a thinner platform will be more pliable. A platform which is excessively thick may be excessively rigid, which may reduce the amplitude and reaction time of the AF head in response to contours of the an adjacent substrate being measured, and may result in physical contact between the AF head 10 and the adjacent substrate 60. A platform 10 which is excessively thin may be excessively pliable, which may result in an excessive amplitude in response to contours of the surface, and can also result in physical contact between the AF head 40 and the adjacent substrate 60. In an embodiment, each flexural hinge 12 at its thinnest point can have a measurement of between about 1 mm and about 10 mm, or between about 3 mm and about 8 mm, or between about 4 mm and about 6 mm. In an embodiment, each flexural hinge 12 can have a cross sectional area, at its thinnest point, of between about 1 $mm^2$ and about 100 $mm^2$, or between about 3 $mm^2$ and about 50 $mm^2$, or between about 10 $mm^2$ and about 25 $mm^2$.

EXAMPLE

Figure 6:
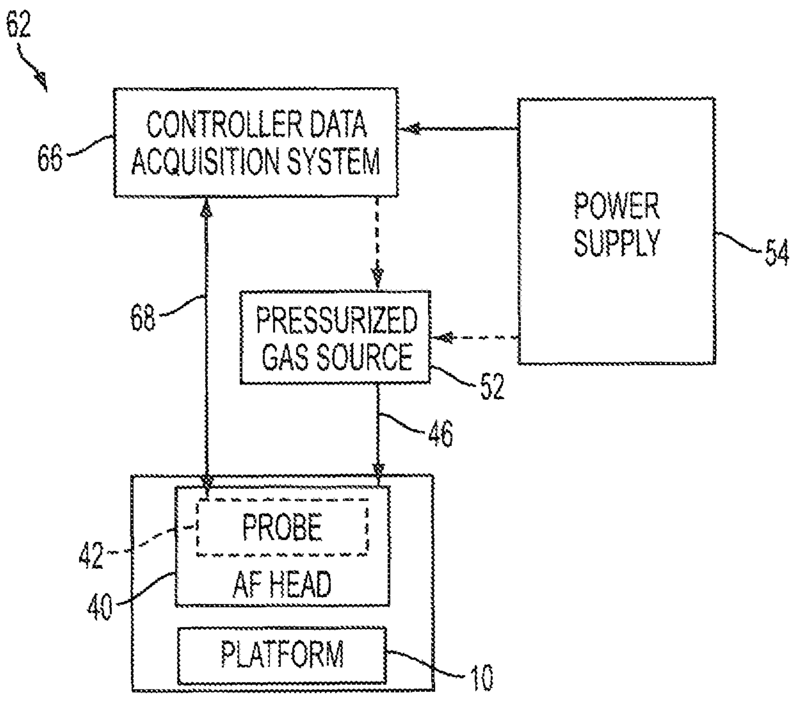
FIG. 6 is a schematic depiction of an AF device in accordance with an embodiment of the present teachings.

Design and testing resulted in a device with the configuration similar to that shown in the schematic depiction of FIG. 6, which includes an AF device 62 according to an embodiment of the present teachings. At least one power supply 64 can be used to power various subassemblies of the AF device 62, such a as a controller/data acquisition system 66 (Le., controller) and, optionally, the pressurized gas source 52. The controller 66 can include a microprocessor and other digital and/or analog devices (not individually depicted for simplicity) for coordinating and controlling the operation of the subassemblies of the AF device 62. The controller 66 can be electrically coupled to the AF head 40 and/or the probe 42 through a bus 68 which transmits signals from the probe 42 to the controller/data acquisition system 66. The bus 68 can further carry bias potential (power) from the controller 66 to the AF head 40 and probe 42.

Figure 7:
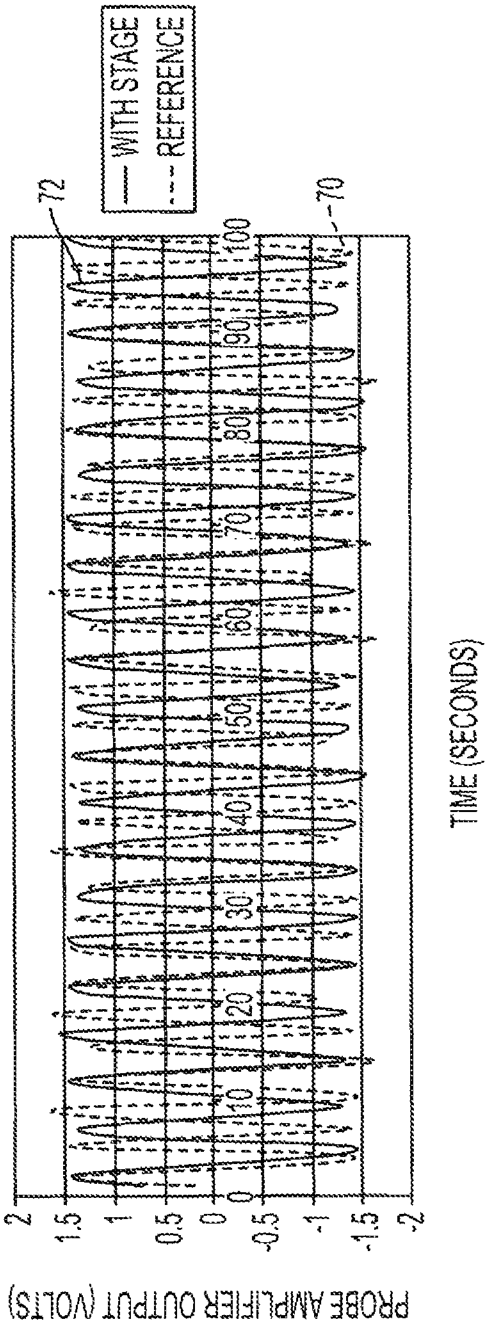
FIG. 7 is a graph depicting a response time of an AF head in accordance with the present teachings to an out-of-plane rotating turntable.

During operation, the pressurized air source 52 can deliver pressurized gas to the AF head 40 through the flexible hose 46, The gas pressure can depend on various factors, such as the weight of the AF head 40 and the size of the orifice 56 in the channel 54. During design and testing of a device similar to that of the schematic depiction of FIG. 6, it was observed that, upon application of compressed air, the parallel stage holding the AF head self-leveled without contact with a rough aluminum surface of a rotary stage as the substrate 60. The rotary stage was rotated at a selected RPM with out-of-plane errors deliberately induced to stress-test the system. The out of plane errors were visible by direct observation. Motions of the AF head responding to the out-of-plane rotation were amplified by the flexural hinges 12 of the parallel stage. The response can also be demonstrated quantitatively by biasing the drum with a known AC signal of constant amplitude and monitoring the signal via the floating capacitive probe using a test system similar to that described in U.S. Pat. No. 8,169,210. Changes in the amplitude of the sensed AC signal correspond to changes in the gap distance. A "reference" signal 70 was obtained as shown in the graph of FIG. 7 by stopping the rotation and statically floating the AF head 40 including the probe 42. The "with stage" signal 72 of FIG. 7 is a plot of the signal voltage during rotation of the measured substrate 60. The variability of both signals 70, 72 is comparable, indicating good dynamic performance. The "with stage" signal 72 does not indicate any excessive measureable changes in the gap distance $d_1$ compared to the actual gap distance, which indicates that the AF head 40 as supported by the parallel stage 10 may be sufficiently robust for gap control to compensate for disturbances from any directions in rotation of the rotating turntable being measured. Similar results have been obtained with rotational speed varying from between about five rotations per minute (RPM) and about 1000 RPM.

As depicted in the plan view of FIG. 1A, opening 16 is shown as being off-center relative to the center of the platform 10. In this embodiment, the opening 16 is positioned for the mass center of the AF head 40 during the attachment of the AF head 40 to the platform 10 as depicted in FIGS. 4 and 5, rather than for the center of the platform 10 itself. This assists in maintaining a level position of the AF head 40 during use of the device.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on" "side" (as in "sidewall"), "higher," "lower," "over," "top," and "under" are defined with respect to the conventional plane or working surface being on the top surface of the workpiece, regardless of the orientation of the workpiece.

The invention claimed is:

1. An apparatus comprising a non-contact gap control device for maintaining a distance between surfaces, the apparatus comprising:

a pliable platform comprising a flexible sheet, a center portion having a shape, and a plurality of flexural hinges, wherein each flexural hinge is proximate to a different vertex of the shape of the center portion;

a frame having an opening therethrough, wherein the pliable platform is secured to the frame and within the opening in the frame;

a floating head attached to the pliable platform; and a pressurized gas source attached to the floating head.

2. The apparatus of claim 1, further comprising:

a flexible hose coupled to the floating head, wherein the flexible hose is configured to deliver pressurized gas to the floating head; and a channel within the floating head, wherein the channel is configured to receive the pressurized gas from the flexible hose at a first location at a first side of the pliable platform, and to deliver the pressurized gas onto a substrate at a second location at a second side of the pliable platform which is opposite the first side.

3. The apparatus of claim 1, wherein the pliable platform comprises a material selected from the group consisting of polydimethylsiloxane (PDMS), polysiloxane, polyalkylsiloxane, polyurethane, polyester, polyfluorosilioxanes, polyolefin, fluoroelastomer, synthetic rubber, natural rubber, and mixtures thereof.

4. The apparatus of claim 1, wherein the pliable platform has a thickness of from 0.5 mm to 20 mm.

5. The apparatus of claim 1, wherein the shape of the pliable platform is selected from the group consisting of a triangle, a square, a pentagon, and a hexagon.

6. The apparatus of claim 1, wherein each flexural hinge, at its thinnest point, has a cross sectional area of from 1 $mm^2$ to 100 $mm^2$.

7. The apparatus of claim 1, further comprising an opening through the pliable platform, wherein the opening through the pliable platform is off-center relative to the center portion of the pliable platform and is positioned for a mass center of the floating head.

8. A method for measuring a substrate, comprising:

positioning a non-contact gap control device adjacent to a substrate, wherein the non-contact gap control device comprises:

a pliable platform comprising a flexible sheet, a center portion having a shape, and a plurality of flexural hinges, wherein each flexural hinge is proximate to a different vertex of the center portion of the pliable platform;

a frame having an opening therethrough, wherein the pliable platform is secured to the frame and within the opening in the frame;

a floating head attached to the pliable platform; and a pressurized gas source attached to the floating head;

ejecting a pressurized gas through a channel within the floating head and onto the substrate; and measuring the substrate using a measurement probe, during the measurement of the substrate, the pliable platform flexes to self-adjust a distance between the floating head and the adjacent substrate.

9. The method of claim 8, further comprising:

delivering the pressurized gas to a first side of the floating head at a first side of the platform through a flexible hose; and ejecting the pressurized gas at a second side of the floating head at a second side of the platform which is opposite to the first side of the platform and onto the substrate.

10. The method of claim 8, further comprising delivering the pressurized gas to the floating head at a pressure of from 10 psi to 80 psi.

11. The method of claim 8, wherein the positioning of the non-contact gap control device positions the pliable platform, wherein the pliable platform comprises a material selected from the group consisting of polydimethylsiloxane (PDMS), polysiloxane, polyalkylsiloxane, polyurethane, polyester, polyfluorosilioxanes, polyolefin, fluoroelastomer, synthetic rubber, natural rubber, and mixtures thereof.

12. The method of claim 8, wherein:

the positioning of the non-contact gap control device positions the pliable platform; and the shape of the center portion of the pliable platform is selected from the group consisting of a triangle, a square, a pentagon, and a hexagon.

13. The method of claim 12, wherein a first distance from the floating head to the substrate is less than or equal to a second distance from the pliable platform to the substrate.

14. The method of claim 8, wherein the floating head further comprises a measurement probe and the method further comprises measuring the substrate using the measurement probe during the ejection of the pressurized gas.

15. The method of claim 8, further comprising an opening through the pliable platform, wherein the opening through the pliable platform is off-center relative to the center portion of the pliable platform and is positioned for a mass center of the floating head.

16. The method of claim 8, wherein the positioning of the non-contact control device positions the pliable platform, wherein the pliable platform has a thickness of from 3.5 mm to 6.5 mm.

17. An apparatus comprising a non-contact gap control device for maintaining a distance between surfaces, the apparatus comprising:

a pliable platform comprising a flexible sheet having a center portion and flexural hinges, wherein each flexural hinge is proximate to a vertex of the center portion of the pliable platform and the pliable platform comprises a material selected from the group consisting of polydimethylsiloxane (PDMS), polysiloxane, polyalkylsiloxane, polyurethane, polyester, polyfluorosilioxanes, polyolefin, fluoroelastomer, synthetic rubber, natural rubber, and mixtures thereof.

18. The non-contact gap control device of claim 17, wherein the center portion of the pliable platform comprises a shape selected from the group consisting of a triangle, a square, a pentagon, and a hexagon.

19. An apparatus comprising a non-contact gap control device for maintaining a distance between surfaces, the apparatus comprising:

a pliable platform comprising a flexible sheet and an opening through the pliable platform, wherein the opening through the pliable platform is off-center relative to a center portion of the pliable platform and is positioned for a mass center of the floating head;

a frame having an opening therethrough, wherein the pliable platform is secured to the frame and within the opening in the frame;

a floating head attached to the pliable platform; and a pressurized gas source attached to the floating head.

20. The apparatus of claim 19, wherein the center portion of the pliable platform comprises a shape selected from the group consisting of a triangle, a square, a pentagon, and a hexagon.

* * * * *